US012631604B2

(12) United States Patent (10) Patent No.: US 12,631,604 B2
Fogwill et al. (45) Date of Patent: May 19, 2026

(54) LIGHT-GUIDING FLOW CELL TECHNOLOGIES

(71) Applicant: Waters Technologies Corporation, Milford, MA (US)

(72) Inventors: Michael O. Fogwill, Uxbridge, MA (US); Joseph D. Michienzi, Plainville, MA (US); Sebastien Besner, Bolton, MA (US); Brett G. Cook, Lakeville, MA (US); Peter O'Brien, Belgooly (IE)

(73) Assignee: Waters Technologies Corporation, Milford, MA (US)

( * ) Notice: Subject to any disclaimer, the term of this patent is extended or adjusted under 35 U.S.C. 154(b) by 567 days.

(21) Appl. No.: 17/990,059

(22) Filed: Nov. 18, 2022

(65) Prior Publication Data

US 2023/0152283 A1 May 18, 2023

Related U.S. Application Data

(60) Provisional application No. 63/280,889, filed on Nov. 18, 2021.

(51) Int. Cl.
 *G01N 30/60* (2006.01)
 *G01N 30/02* (2006.01)
(52) U.S. Cl.
 CPC ..... *G01N 30/6078* (2013.01); *G01N 30/6017* (2013.01); *G01N 30/6082* (2013.01); *G01N 2030/027* (2013.01)

(58) Field of Classification Search
 None
 See application file for complete search history.

(56) References Cited

U.S. PATENT DOCUMENTS

| 3,814,497 | A | 6/1974 | Stone |
| 3,975,104 | A | 8/1976 | Munk |
| 5,423,513 | A | 6/1995 | Chervet et al. |
| 5,434,664 | A | 7/1995 | Sapp |

(Continued)

FOREIGN PATENT DOCUMENTS

| EP | 0759567 A2 | 2/1997 |
| EP | 1557658 A1 | 1/2005 |
| ES | 2377908 A1 * | 4/2012 | ............. G01N 21/85 |

OTHER PUBLICATIONS

"Beginner's Guide to UPLC: The Promise of Small Particles," May 2022, Waters Technologies Corporation. https://www.waters.com/waters/en_US/The-Promise-of-Small-Particles/nav.htm?cid=134804750&locale=en_US.

(Continued)

*Primary Examiner* — Krishnan S Menon
(74) *Attorney, Agent, or Firm* — Schmeiser, Olsen & Watts LLP; Timothy P. Collins, Esq.

(57) ABSTRACT

A flow cell for a liquid chromatography detector comprises a substrate formed of a glass material; a fluidic channel extending through the substrate; and at least one gas filled region formed in the substrate along at least a portion of a (Continued)

length of the fluidic channel. A portion of the glass material separates the fluidic channel and the gas filled region. An interface between the gas filled region and the portion of the glass material separating the fluidic channel and the gas filled region enables total internal reflection of light propagating along the fluidic channel.

19 Claims, 10 Drawing Sheets

(56) References Cited

U.S. PATENT DOCUMENTS

| 5,815,258 | A | 9/1998 | Nakanishi |
| 5,883,721 | A | 3/1999 | Gilby et al. |
| 6,188,813 | B1 | 2/2001 | Dourdeville et al. |
| 6,542,231 | B1 | 4/2003 | Garrett |
| 6,678,051 | B2 | 1/2004 | Gerner et al. |
| 7,005,090 | B2 | 2/2006 | Mueller et al. |
| 8,213,015 | B2 | 7/2012 | Kraizcek et al. |
| 9,752,978 | B2 | 9/2017 | Kraiczek et al. |
| 2014/0055782 | A1 | 2/2014 | Hatahori |
| 2014/0373606 | A1 | 12/2014 | Kraiczek et al. |

OTHER PUBLICATIONS

"Coating glass capillary tubes with Ag," 2004, finishing.com. https://www.finishing.com/267/40.shtml.

Lahiri, Abhishek, Giridhar Pulletikurthi and Frank Endres, "A Review on the Electroless Deposition of Functional Materials in Ionic Liquids for Batteries and Catalysis" Frontiers in Chemistry, vol. 7, Feb. 20, 2019.

Hawkins, Aaron R. and Holger Schmidt "Optofluidic waveguides: II. Fabrication and structures," Microfluid Nanofluidics, 4(1-2), pp. 17-32, Jul. 19, 2007.

International Preliminary Report on Patentability in PCT/US2022/050381 mailed on May 30, 2024.

Invitation to Pay Additional Fees in International Patent Application No. PCT/US2022/050381 mailed on Feb. 16, 2023.

International Search Report and Written Opinion in International Patent Application No. PCT/US2022/050381 mailed on Apr. 11, 2023.

Llobera, A. et al., "Multiple internal reflection poly(dimethylsiloxane) systems for optica sensing," Aug. 2007, Lab on a Chip No. 7, pp. 1560-1566.

Examination Report in European Patent Application No. 22839045.6 mailed on Feb. 24, 2026.

* cited by examiner

1100

1102 — MASK FUSED SILICA WAFERS

1104 — ETCH WAFERS

1106 — FORM QUARTZ LAYER

1108 — BOND WAFERS

1110 — MASK BONDED WAFER

1112 — ETCH BONDED WAFER

1114 — DICE WAFER

1200

1202 — EXPOSE WAFERS TO LASER

1204 — ETCH WAFERS

1206 — PERFORM SURFACE POLISHING OPERATION

1208 — FORM QUARTZ LAYER

1210 — BOND WAFERS

1212 — DICE WAFER

LIGHT-GUIDING FLOW CELL TECHNOLOGIES

RELATED APPLICATION

This application is a non-provisional patent application claiming priority to U.S. Provisional Patent Application No. 63/280,889, filed Nov. 18, 2021, titled "Light-Guiding Flow Cell Technologies for Absorbance Detection," which is incorporated herein by reference in its entirety.

FIELD OF THE INVENTION

The disclosed technology relates generally to liquid chromatography systems. More particularly, the technology relates to a flow cell for liquid chromatography.

BACKGROUND

In liquid chromatography systems, a fluidic sample is pumped through a column tube, then to a detector flow cell where the sample flows through the beam path of an optical device so that components of the sample, for example, varying concentrations of specific analyte molecules within a chromatographic band, can be identified. Conventional flow cells may contribute to analyte loss, which can compromise the chromatographic efficiency of the flow cells. Conventional flow cell light-guiding technology also has a high manufacturing burden when forming sub-assemblies of a detector.

SUMMARY

In one aspect, a flow cell for a liquid chromatography detector comprises a substrate formed of a glass material; a fluidic channel extending through the substrate; and at least one gas filled region formed in the substrate along at least a portion of a length of the fluidic channel, wherein a portion of the glass material separates the fluidic channel and the gas filled region, and wherein an interface between the at least one gas filled region and the portion of the glass material separating the fluidic channel and the at least one gas filled region enables total internal reflection of light propagating along the fluidic channel.

The at least one gas filled region may include a first air gap extending along one side of the fluidic channel and a second air gap extending along another side of the fluidic channel. The first and second air gaps may extend in a same longitudinal direction as a direction of extension of the fluidic channel through the substrate.

The at least one gas filled region may include a third air gap above the fluidic channel and a fourth air gap below the fluidic channel. The third and fourth air gaps extend may in a same longitudinal direction as a direction of extension of the fluidic channel through the substrate.

A first end of the fluidic channel may receive the light, which may propagate to a second end of the fluidic channel where it is directed to a detector.

The flow cell of claim 4 may further comprise a mirror at the first end and the second end of the fluidic channel.

The mirror may be integrated into the substrate at one or both of the first end and the second end.

The flow cell may further comprise a reflective coating about a portion of the fluidic channel.

The at least one gas filled region may include air.

In another aspect, a flow cell for a liquid chromatography detector comprises a substrate formed of a glass material; a fluidic channel extending through the substrate; and a reflective coating about a portion of the fluidic channel, wherein the reflective coating enables an internal reflection of light propagating along the fluidic channel.

The reflective coating may be external to the fluidic channel.

The reflective coating may be internal to the fluidic channel.

A portion of the glass material may separate the fluidic channel and the reflective coating.

The flow cell may further comprise first and second gas filled regions adjacent to and parallel the fluidic channel.

The first and second gas filled regions may include at least a portion of the reflective coating.

The flow cell may further comprise a third gas filled region above the fluidic channel and a fourth gas filled region below the fluidic channel, the third and fourth gas filled regions extending in a same longitudinal direction as a direction of extension of the fluidic channel through the substrate.

The reflective coating may include a mirror integrated in the substrate at an input and an output of the fluidic channel.

In another aspect, a flow cell for a liquid chromatography detector comprises a substrate formed of a glass material; a fluidic channel extending through the substrate, the fluidic channel having an input and an output; and an integrated mirror at the input and/or the output, wherein the mirror enables an internal reflection of light propagating along the fluidic channel.

The flow cell may further comprise at least one gas filled region adjacent to and parallel to the fluidic channel. A portion of the glass material may separate the fluidic channel and the at least one gas filled region. An interface may be between the at least one gas filled region and the portion of the glass material separating the fluidic channel and the at least one gas filled region enables an internal reflection of light propagating along the fluidic channel.

At least one gas filled region may include first and second air gaps. The first air gap may extend along one side of the fluidic channel and the second air gap may extend along another side of the fluidic channel.

The flow cell may further comprise a third air gap above the fluidic channel and a fourth air gap below the fluidic channel, the third and fourth air gaps extending in a same longitudinal direction as a direction of extension of the fluidic channel through the substrate.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1:
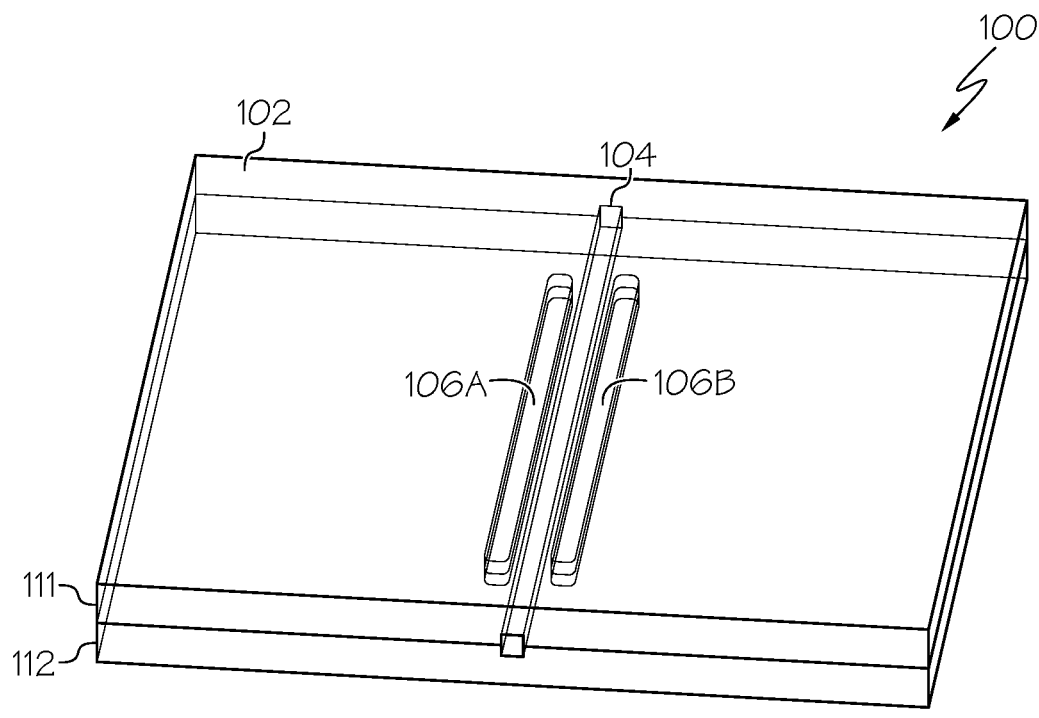
FIG. 1 is a perspective view of an example of a flow cell.

Reference in the specification to an embodiment or example means that a particular feature, structure, or characteristic described in connection with the embodiment or example is included in at least one embodiment or example of the teaching. References to a particular embodiment or example within the specification do not necessarily all refer to the same embodiment or example.

The present teaching will now be described in detail with reference to exemplary embodiments or examples thereof as shown in the accompanying drawings. While the present teaching is described in conjunction with various embodiments and examples, it is not intended that the present teaching be limited to such embodiments and examples. On the contrary, the present teaching encompasses various alternatives, modifications, and equivalents, as will be appreciated by those of skill in the art. Those of ordinary skill having access to the teaching herein will recognize additional implementations, modifications, and embodiments, as well as other fields of use, which are within the scope of the present disclosure as described herein.

In brief overview, embodiments and examples disclosed herein rely on modern glass manufacturing and glass bonding technologies so that reflection-improving and analyte loss-reducing structures can be formed in a glass substrate for directing light in a chromatography application. Glass can be compatible with biopolymers and can be produced robustly, while reducing the manufacturing burden. A light-fluid interface can be formed in the glass material itself that provides both desirable light throughout and chromatographic efficiency. The interface may include a combination of air gaps, integrated mirrors, and/or reflective materials such as metal formed in the glass material for providing light guidance through flow cells. Therefore, the light can be detected by a single channel detector or a broadband light source such as a spectrometer, but not limited thereto.

A flow cell formed according to the foregoing offers benefits over conventional flow cell light-guiding technology, for example, flow cells formed of a Teflon™ AF (amorphous fluoropolymer) material. However, Teflon™ AF requires performance tradeoffs to implement. A main reason for developing the inventive concept is that Teflon™ based light-guiding flow cells display poor performance in aqueous SEC and IEX applications due to surface interaction with large biomolecules, such as recovery loss and peak tailing. In addition, Teflon™ AF is subject to contamination and fouling and involves a more complicated manufacturing process. In particular, much of the manufacturing burden is related to the tolerance requirement associated with the small volume of the flow cell and a significant number of manual assembly steps. Conventional glass capillary light-guiding flow cells offer a better throughout than Teflon™ AF cells. However, glass capillary flow cells involve manufacturing complexities, especially with respect to fluidic coupling efficiencies and can also have difficulty satisfying certain design requirements such as pressure ratings.

FIG. 1 is a perspective view of an example of a flow cell 100. The flow cell 100 can be formed by a semiconductor wafer fabrication process, for example, a CMOS process involving isotropic/anisotropic etching, laser subtractive processing, and the like, described below but not limited thereto. A plurality of flow cells 100, e.g., 64 cells, may be fabricated from a single wafer.

The flow cell 100 is constructed and arranged to include a combination of fluidic channel diameter, cross-sectional shape, and turn/corner configurations providing an optimal chromatographic performance by reducing the dispersion of an analyte peak passing through the flow cell. In doing so, the flow cell 100 comprises a substrate 102. In some embodiments, the substrate 102 may be formed of two sub-plates 111, 112 that are bonded to each other. The sub-plates 111, 112 can be formed of silica, fused silica, quartz, and/or glass-related material that permits the sub-plates 111, 112 to be bonded together to form the substrate 102 having a fluidic channel 104 and at least one air gap 106A, 106B (generally, 106). Other materials may include transparent materials, ceramics, and/or polymers. In some embodiments, an intermediate layer (not shown), for example, formed of boron phosphorous glass or the like, may be positioned between the sub-plates 111, 112 to allow for fusion bonding during manufacturing. In other embodiments, the substrate 102 includes a unitary body formed of glass, silica, fused silica, quartz, and/or related material and. The material forming the substrate 102 is transparent within a transmitted light wavelength of interest. The substrate material also permits high-pressure operation, is compatible with a wide range of analytes and mobile phase components, and can be functionalized, for example, via chemical vapor deposition or other type of deposition of organic layers where glass is more amenable to coating process than Teflon AF.

The channel and air gaps 106 are formed by an etching process, for example, wet etch, isotropic, and/or anisotropic etching. In one embodiment, each sub-plate 111, 112 may include a portion of the fluidic channel 104 and air gaps 106 and when coupled together form the complete periphery of the fluidic channel 104 and air gap(s) 106. In another embodiment, the entire fluidic channel 104 and air gap(s) 106 are formed in a single unitary (unbonded) substrate 102, for example. Accordingly, embodiments of the present inventive concept allow for air gaps, or other regions in a glass substrate that encompass gas such as air, or an aerogel, vacuum, or material proximal to and/or about some or all the fluidic channel. The air-glass interface provides a combination of refractive indices to provide total internal reflection.

The fluidic channel 104 is constructed and arranged to allow light to interact with a fluidic sample flowing through the central lumen of the fluidic channel 104. Although reference is made to light, the embodiments herein may pertain to optical energy, photons, or related features of light energy. In some embodiments, the light includes photons ranging from 180-900 nm. An optical fiber (not shown) can be coupled to an interface at the inlet and outlet of the channel 104. In some embodiments, the fiber is a multimode fiber (MMF) having a numeral aperture of 0.28 but not limited thereto, a core size of 240 μm but not limited thereto, and/or a wavelength range of 190-400 nm but not limited thereto. Other fiber configurations, ranges, and structures may equally apply depending on optical and mechanical design parameters of the apparatus, such as NA, core diameter, fiber coupling efficiency, light-guide size, geometry, length, wall thickness, and surface roughness requirements. For example, end surfaces of a fiber can be sealed with a transparent material such as a window or lens.

As shown in FIG. 1, the air gap(s) 106 can extend in a same direction as the fluidic channel 104. The fluidic channel 104 and air gap(s) 106 can have a geometry, shape, dimension, and/or other configuration parameter that complies with the application in which the flow cell 100 is used, for example, shown in FIGS. 7 and 9. Although the term air gap is referred to in FIG. 1, equivalent terms may equally apply such as voids or regions. In addition, air gaps 106 may be at least partially filled with gases, liquid, and/or solids other than air. For example, a gas filled region may be an air gap, but not limited thereto. In this example, the gas filled region may be partially or fully filled with gas.

Figure 2:
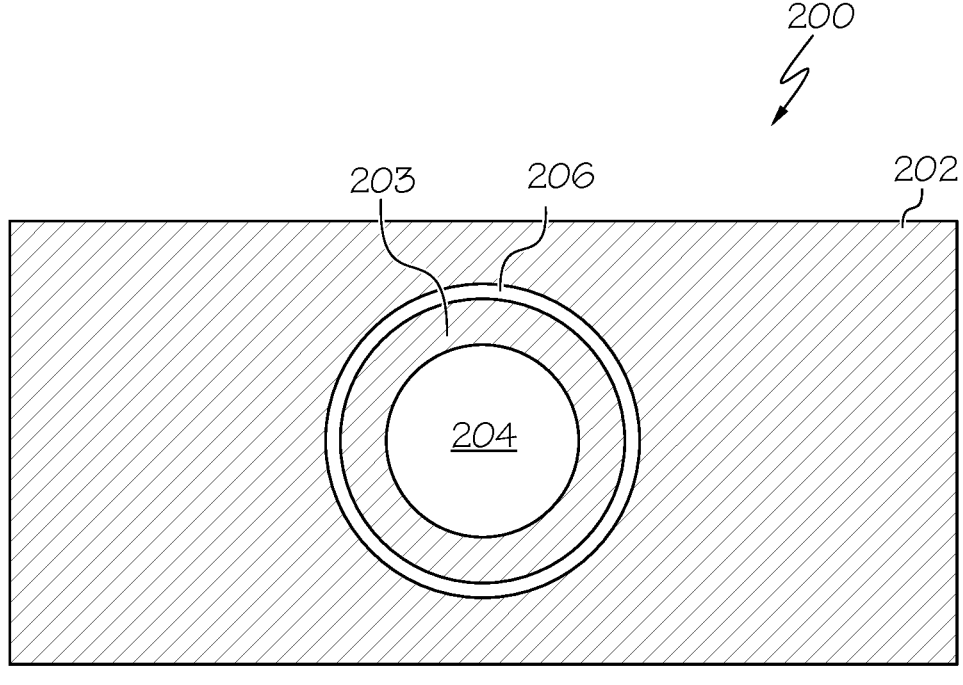
FIG. 2 is a cross-sectional view of an example of an air-glass interface of a flow cell.

In another embodiment, as shown in FIG. 2, a flow cell 200 includes an air gap 206 that extends about a periphery of the fluidic channel 204, rather than on both sides of the fluidic channel 204 is described in FIG. 1. The air gap 206 is separated from the fluidic channel 204 by a glass region 203 by a region of separation having a sufficient thickness to provide stability to the flow cell structure.

Figure 3:
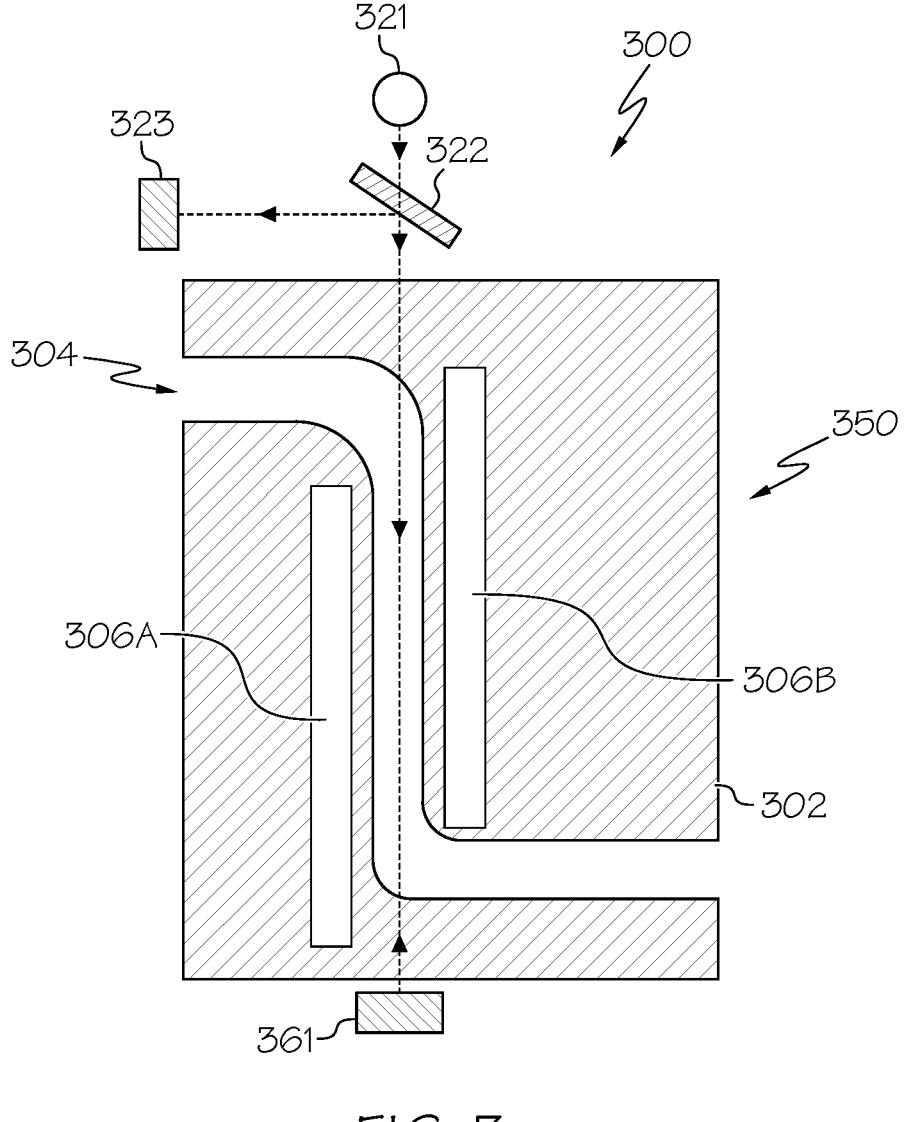
FIG. 3 is a schematic view of a liquid chromatography system including another example of a flow cell.

In another embodiment, as shown in FIG. 3, a flow cell 350 includes air gaps 306A, 306B (generally, 306) that are offset to accommodate the contours of a fluidic channel 304. The air gaps 306 can be parallel to a main section of the fluidic channel 304 that extends along a length of the glass substrate 302, e.g., the fluidic channel 304 including inlet and outlet sections extending from the ends of the main section of the fluidic channel 304 as shown in FIG. 3. Each end interface at the inlet and outlet sections can include an optical fiber (not shown) as the light transmitting passage through the channel 304.

Figures 10A, 10B, 10C, 10D, 10E:
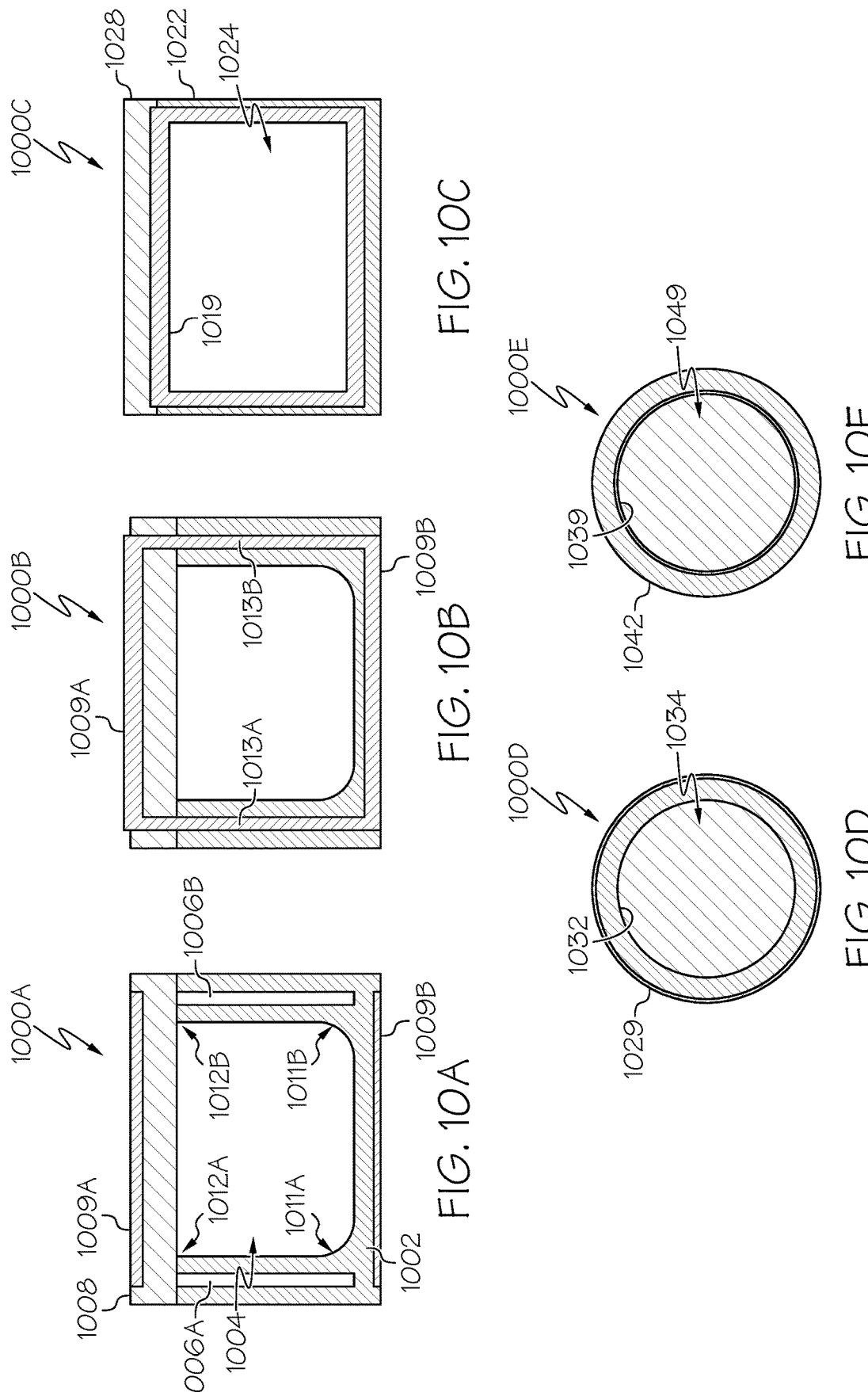
FIGS. 10A-10E are cross-sectional front views of other examples of a flow cell.

The air-glass interface illustrated in FIGS. 1-3 includes a combination of different refractive indices to provide a desirable total internal reflection (TIR), which can only occur when light travels from a higher index of refraction to a medium or lower index of refraction. Light guiding via total internal reflection may be achieved by forming circumferential air gaps around the central fluidic channel. For example, as shown in FIG. 1, the ends of the air gaps 106 can be smooth and rounded to contribute to total internal reflection. In another example, as shown in FIG. 2, the circumferential air gap 206 about the channel 204 can contribute to TIR. Other factors that provide for total internal reflection may include surface characteristics such as roughness, wall thickness, air gap dimensions, and so on. In other embodiments, TIR occurs at a wall of the flow cell, for example, in cases where a reflective material abuts the exterior wall as shown in FIGS. 10A and 10D.

Figure 4:
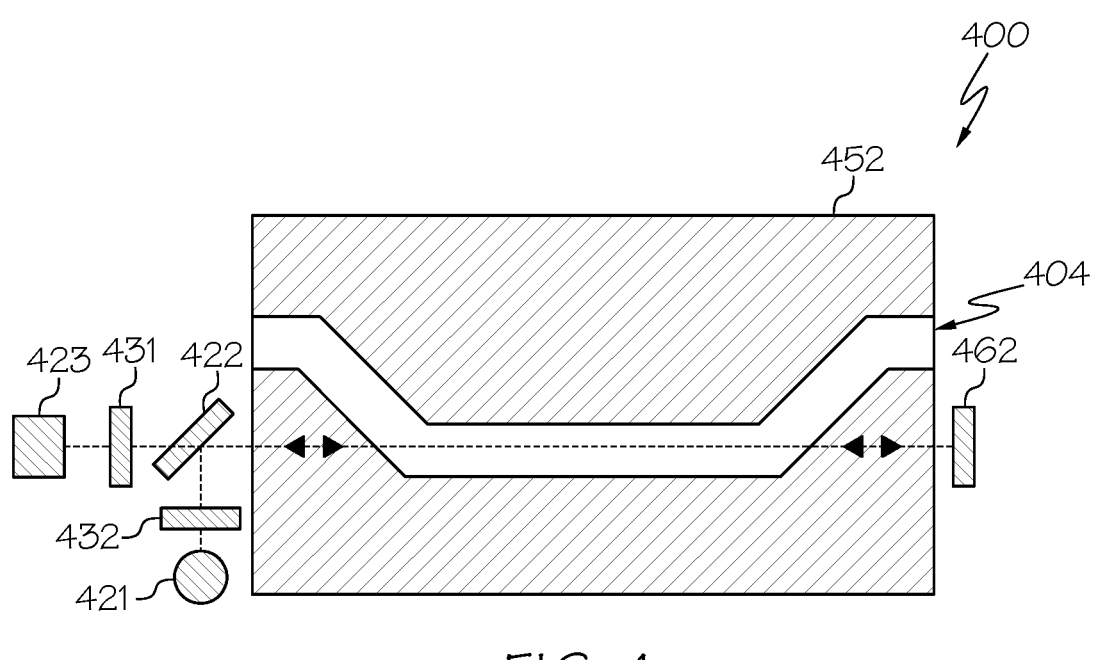
FIG. 4 is a schematic view of a liquid chromatography system including another example of a flow cell.

FIG. 4 shows a view of a liquid chromatography system 400 employing an example of a flow cell. In some embodiments, the flow cell may be formed on a substrate 452 or the like, for example, similar to a glass substrate described with reference to FIGS. 1-3.

Figure 5:
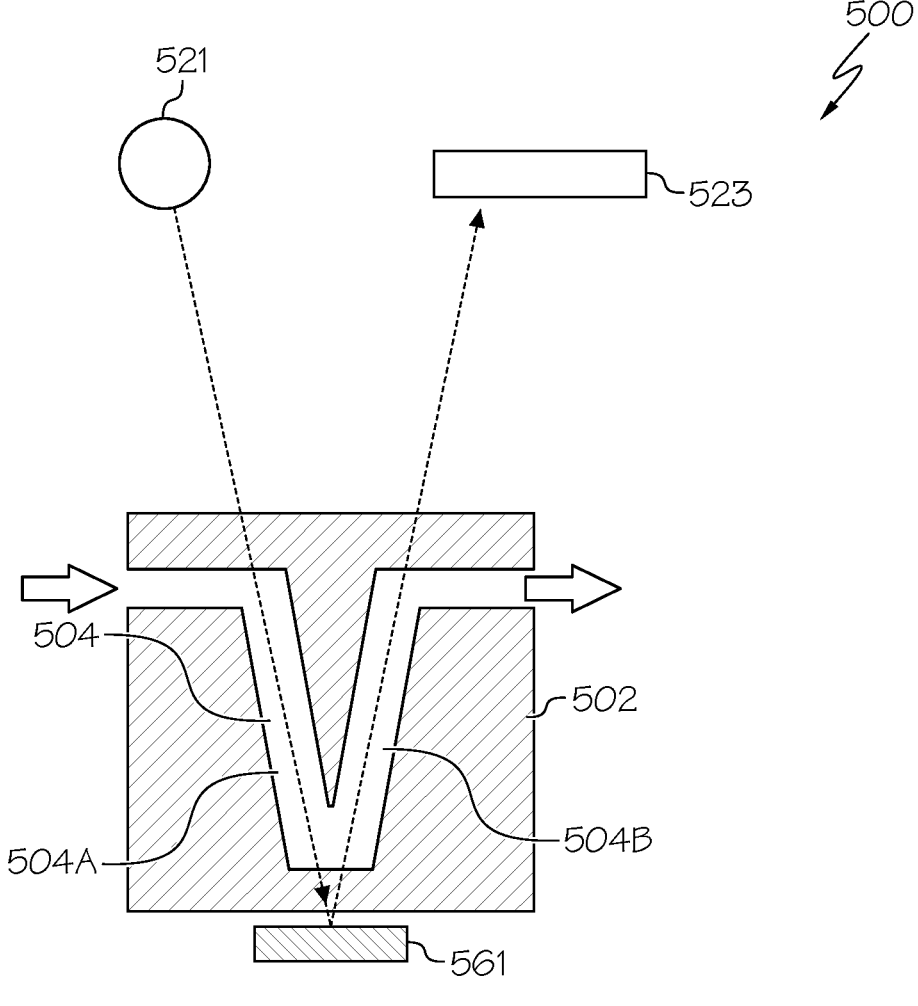
FIG. 5 is a schematic view of a liquid chromatography system including another example of a flow cell.
Figure 6:
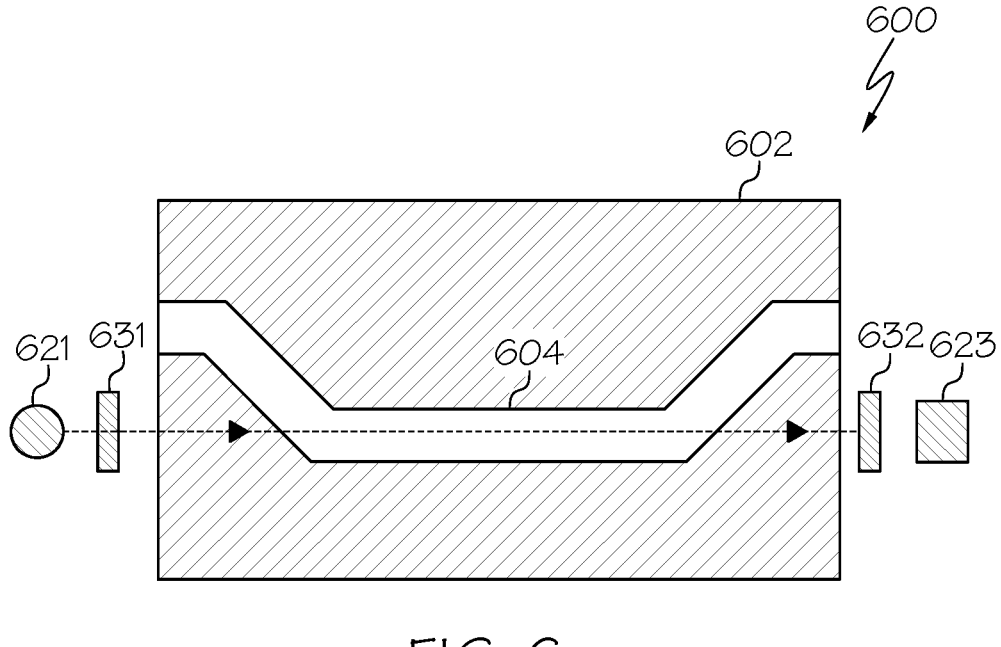
FIG. 6 is a schematic view of a liquid chromatography system including another example of a flow cell.

In some embodiments, the flow cell integrates one or more high-reflection mirrors 462 within the substrate 452 to decrease the flow cell volume by incorporating a folded-path design. In other embodiments, as shown, the mirror 462 is a separate structure adjacent the flow cell for optically communicating with the flow cell. In other embodiments, as shown in FIG. 3, a flow cell 300 can include a combination of air gaps 306 and integrated mirror 361. In other embodiments, as shown in FIG. 5, an integrated mirror 561 is at a bottom region of a flow cell 500 where a V-shaped fluidic channel 504 changes direction and a minimal amount of glass is present between the fluidic channel 504 and the integrated mirror 561. In particular, the fluidic channel 504 has a first straight portion 504A that extends in a direction of light rays output from a UV source 521 and a second straight portion 504B that extends in a direction of light rays reflected from the integrated mirror 561. In other embodiments, the substrate can be coated with a reflective material such as an ultraviolet (UV)-enhanced aluminum (Al) coating or other metallic coatings or other reflective surfaces. A reflective coating may be up to at least 100 nm, but not limited thereto. Such high reflective surfaces directly onto the substrate can enable reflection at the internal or external walls. One application of the integrated mirrors/reflective coatings is to provide multiple light passes through a single length of the fluidic channel. These configurations in FIGS. 3-6 can result in at least double the path length per unit of flow cell volume. These configurations can increase absorbance (i.e. signal to noise ratio) while reducing the volume of the cell (i.e. reducing peak dispersion). The high reflective surface of the flow cells of FIGS. 3-6, respectively, can generally reflect more than 80% of the incident energy.

Referring again to FIG. 3, the liquid chromatography system 300 includes a light source 321, a beamsplitter 322, and a detector 323. The light source 321 is constructed and arranged to direct external light rays so that they enter the flow cell 350 at or near the input, and more specifically, a first bend near the input in the fluidic channel 304. For example, the light source 302 can be a broadband LED light source. In some embodiments, the light source 302 can a laser-based light source. The fluidic channel 304 extends through the flow cell body, in particular, the glass substrate 302, and includes inlet and outlet ends and an elongated section between the inlet and outlet ends. The inlet and outlet ends may each have an interface coupled or integrated thereto. The elongated section may connect the inlet and outlet ends by bends extending on both sides of the flow cell 350. The integrated mirror 361 may be proximal to the second bend. The light source 321 can direct the light rays through the first bend to the elongated section, then through the second bend to the integrated mirror 361 which reflects the light to the beamsplitter 322 where they are detected by the detector 323 or the like and analyzed, for example, providing information about, the solutes contained in the sample, for example. The detector 323 can be a single channel detector or a broadband light source such as a spectrometer, but not limited thereto.

Referring again to FIG. 4, the liquid chromatography system 400 includes a light source 421, a beamsplitter 422, a detector 423, which may be similar to or the same as the 300 includes a light source 321, a beamsplitter 322, and a detector 323 of FIG. 3. In addition, the system 400 may include optical transfer elements 431, 432 such as lenses, concave mirrors, and the like, which may be co-located with the light source 421, beamsplitter 422, and detector 423 at a proximal end of the channel 404. The reflective coating or mirror 462 may be at a distal end of the channel 404. The light beam(s) extend through the elongated straight portion of the fluidic channel 404 to the mirror 462, which reflects the light through the fluidic channel 404 to the beamsplitter 422 where they are detected by the detector 423 or the like and analyzed.

The liquid chromatography system 600 is similar to the system 400 of FIG. 4, except that a first optical element 631 is at the proximal end of the channel 604 and a second optical element 632 and detector 623 are at a distal end of the channel 604. Other details of the operation of the liquid chromatography system 600 are not repeated for brevity.

Referring again to FIG. 5, the liquid chromatography system 400 also includes a light source 521 and a detector 523. Here, the light source 521 can direct the light rays through the first straight section 504A of the fluidic channel they are detected by the detector 523 or the like and analyzed.

Figures 7, 8:
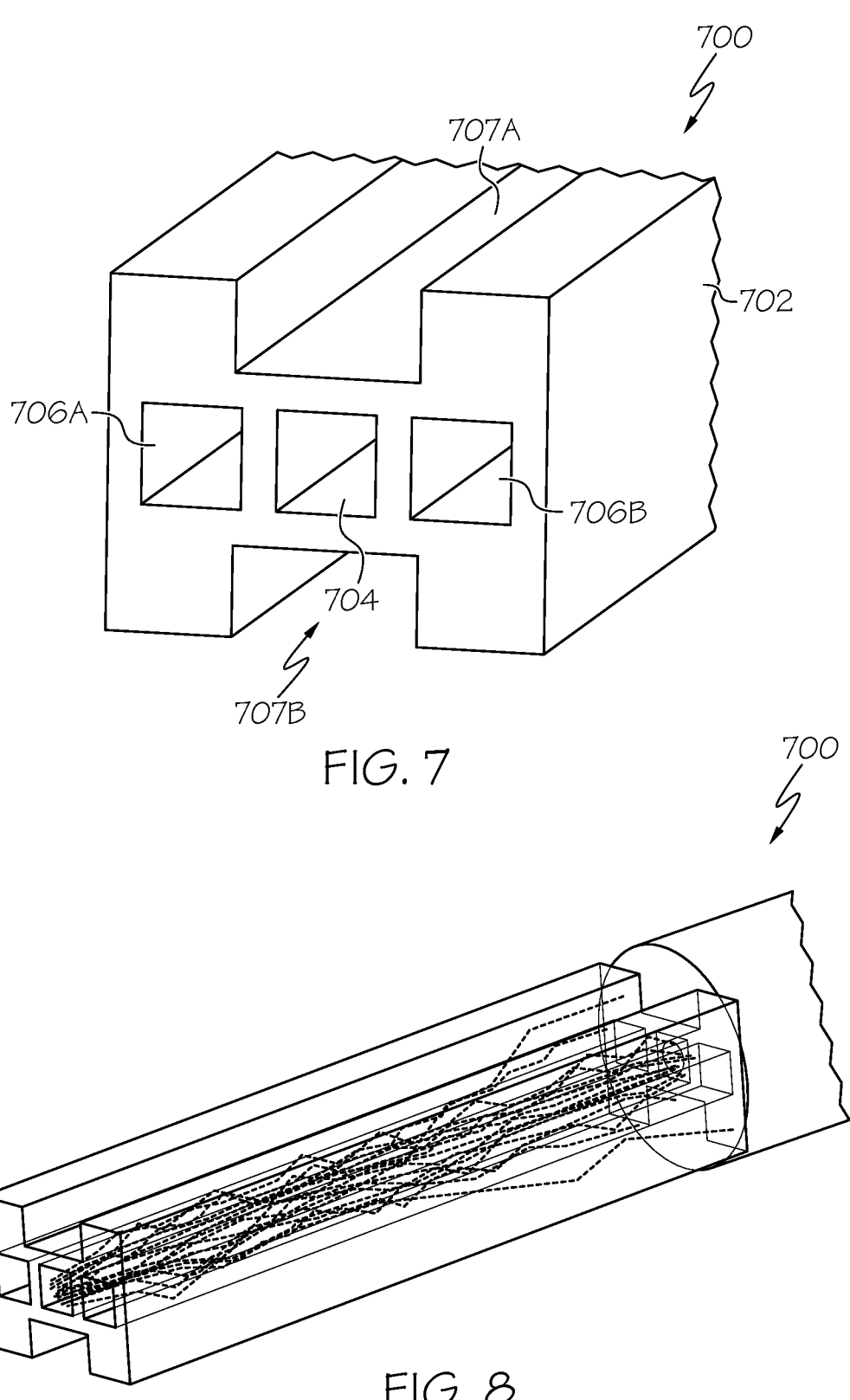
FIG. 7 is a perspective view of another example of a flow cell.
FIG. 8 illustrates the flow cell of FIG. 7 transmitting light by total internal reflection (TIR) during an operation.

FIG. 7 is a perspective view of another example of a flow cell 700. The flow cell 700 can be formed by an anisotropic etching process, but is not limited thereto. The flow cell 700 in some examples can be implemented in a liquid chromatography system, for example, shown in FIGS. 3-6.

In some embodiments, as shown in FIG. 7, the flow cell 700 includes a square fluidic channel 704. The flow cell 700 includes a first square air gap 706A on a first side of the fluidic channel 704 and a second square gap 706B on a second side of the fluidic channel 704 opposite the first air gap 706A. The channel 704 and square air gaps 706A, 706B (generally, 706) can have a same dimension, for example, 280 micron width. The flow cell 700 may have a path length of 1-10 mm but not limited thereto.

In addition, the flow cell 700 includes a first rectangular air gap 707A above the fluidic channel 704 and a second rectangular air gap 707B below the fluidic channel 704. The quadrilateral; e.g., rectangular, air gaps 707A, 707B (generally, 707) can have a same dimension, for example, 520 micron width and 260 micron height. The channel 704 may have a length of up to 10 mm, or longer but not limited thereto. The thickness of the glass walls of the substrate 704 may be 100 microns or more, but not limited thereto.

As shown in FIG. 8, the flow cell 700 can transmit light in a manner such that the flow cell 70 provides TIR at the glass-air interfaces. The arrangement of air gaps 706, 707 in combination with the geometry of the channel 704 can minimize or eliminate a loss of light through the channel 704. Accordingly, transmission is well maintained in a microchannel 704 fabricated via anisotropic etching. In some embodiments, a laser subtractive method is applied, where the illuminated area has an etch rate that is faster than the non-illuminated area permitting an etching of arbitrary shapes within the bulk of the substrate.

Figure 9:
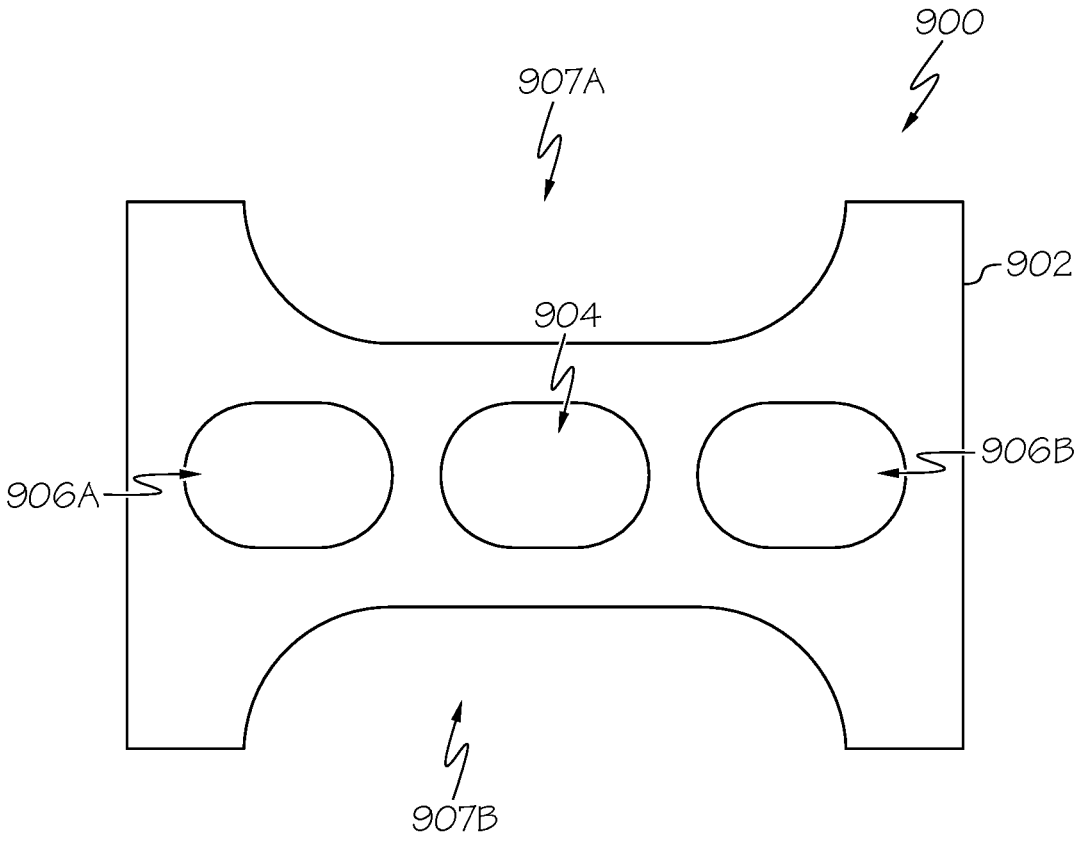
FIG. 9 is a front view of another example of a flow cell.

As previously described, the channel 704 may have a quadrilateral geometry, e.g., square or rectangular shape, formed by anisotropic etching. Other shapes may equally apply, such as but not limited to trapezoidal, triangular, elliptical, and so on. The channel 704 formed in this manner may have different transmission characteristics, for example, improved transmission, as compared to a channel having rounded corners. Nevertheless, as shown in FIG. 9, a flow cell 900 may have circular e.g., elliptical or other rounded, channels 904 and air gaps 906A, 906B (generally, 906), 907A, and 907B (generally, 907) formed by wet isotropic etching. In this example, the channel 904 and adjacent air gaps 906 may have a same dimension, for example, 380 micron width and rounded corners. The air gaps 907 above and below the channel 904 may have a same dimension, e.g., a width of 1100 microns.

FIGS. 10A-10E are cross-sectional front views of other flow cell configurations having various channel geometries which can affect overall transmission characteristics. As Some or all of the internal or external walls can be coated with a reflective coating. The TIR has better reflectance but is more sensitive to the angle of incidence and can't guide (reflect) rays below the critical angle. TIR efficiency is also influenced by the cleanliness of the glass-air interface and the scattering properties of this interface. While contamination is not a problem for embedded air gap, it may be of concern for external surfaces. To remediate this issue, the top and bottom surfaces of FIGS. 7 and 9 can be covered with a reflecting coating to increase the robustness of the device (FIG. 10A). The reflective coatings are also less demanding than TIR in term of surface roughness. For devices where the air gap can't produce efficient transmission efficiency either due to the geometrical factors or surface scattering properties, the air gaps can be coated prior to the substrate bonding to fully enclose the fluidic volume with a reflective layer at the external walls (FIG. 10B). Alternatively, shown, some or all of the internal or external walls of a flow cell can be coated with a reflective coating. In particular, FIG. 10A illustrates a flow cell 1000A. Flow cell 1000A may have a generally square or rectangular channel 1004, but with two rounded corners 1011A, 1011B and two sharp edges 1012A, 1012B. Other channel shapes can equally apply that the reflection of the rays at the glass-air interface back to the fluidic channel 1004 with minimal glass propagation. Flow cell 1000A may also have adjacent air gaps 1006A, 1006B, a first reflective coating 1009A above the channel 1004, and a second reflective coating 1009B below the channel 1004. The second reflective coating 1009B may be applied directly on the substrate 1002. After the fluidic channel 1004 and air gaps 1006 are formed in the substrate 1002 by etching or the like, at least one other layer 1008 formed of a layer of silicon or related material may be positioned on a top surface of the substrate 1002 and cover an exposed top region of the substrate 1002 to complete the formation of the channel 1004. In other embodiments, the layers 1002, 1008 both have identical etches to allow for them to bring the ratio of the size of the channel and air gaps to 1:1. The layers 1002, 1008 can be attached by anodic bonding or the like. The first reflective coating 1009A may be applied directly on the intermediate layer 1008. The abovementioned elements of the flow cell 1000A may be formed of materials described in other embodiments above, and are not repeated for brevity.

During operation, the TIR and reflective coating can reflect the light back toward the center of the fluidic channel 1004 and are exchangeable. The TIR has better reflectance but is more sensitive to the angle of incidence and cannot guide, e.g., reflect, light rays below a critical angle. TIR efficiency is also influenced by the purity or cleanliness of the glass-air interface and the scattering properties of the interface. While contamination is not a problem for the embedded air gaps 1006, it may be of concern for external surfaces. To remedy this issue, referring again to the configurations shown in FIGS. 7-9, the top and bottom surfaces can be covered with a reflecting coating to increase the robustness of the flow cell 1000A.

The reflective coatings are generally less demanding than TIR in term of surface roughness. For flow cell devices where the air gap cannot produce efficient transmission efficiency either due to the geometrical factors or surface scattering properties, as shown in FIG. 10B, the air gaps can be coated or at least partially filled with a reflective coating 1013A, 1013B (generally 1013) prior to the substrate bonding to fully enclose the fluidic volume with a reflective layer at the external walls (FIG. 10B).

A flow cell 1000C shown in FIG. 10C includes a reflective coating 1019 that is similar to the reflective coatings 1009, 1013 of FIGS. 10A and 10B, respectively. However, the reflective coating 1019 is coated about the interior of the substrate 1022 instead of the exterior of the substrate 1002 of the flow cells 1000A and 1000B. Therefore, the perimeter of the channel 2024 is formed by the coating 1019 to fully enclose the fluidic volume with the reflective layer, i.e., coating 1019. The coating 1019 may be protected from the solvent flowing within the flow cell 1000C. Many oxides and fluoride protective layers can be selected for this based on their solvent compatibility and overall transmission. The channel 1024 may have a square or rectangular shape as shown, or may have at least two curved corners, for example, shown in FIGS. 9, 10A and 10B but are not limited thereto. Therefore, the channel 1024, like the fluidic channels of the other flow cells of FIGS. 10A-10E may have different shapes, for example, depending on the process used to form the flow cells.

A flow cell 1000D shown in FIG. 10D has a circular configuration. A reflective coating 1029 is about the substrate 1032 so that the glass material of the substrate 1032 is between the reflective coating 1029 and the channel 1032.

A flow cell 1000E shown in FIG. 10E likewise has a circular configuration. Here, a reflective coating 1039 is internal to the glass material of the substrate 1042 so that the reflective coating 1039 forms the perimeter for the channel 1042.

Figure 11:
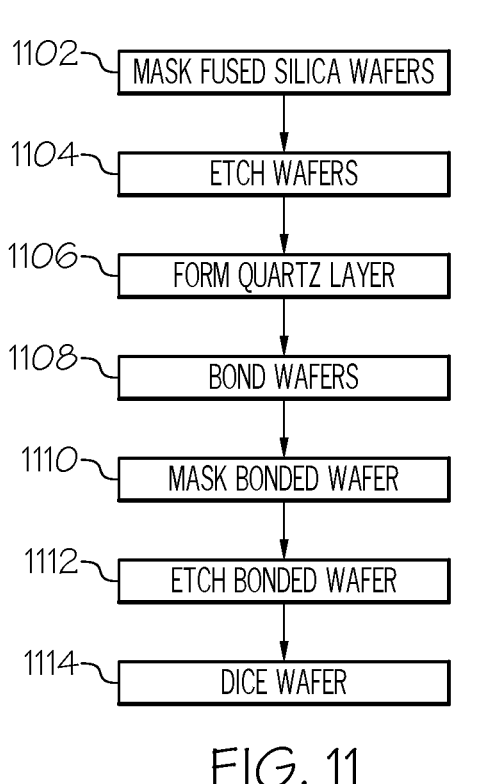
FIG. 11 is a flowchart representation of an example of a method for forming a light guiding flow cell.

FIG. 11 is a flowchart representation of an example of a method 1100 for forming a light guiding flow cell. In describing the method 1100, reference can be made to elements of FIGS. 1-10. In particular, the method 1100 can be applied to form the flow cell 900 of FIG. 9.

At block 1102, a masking operation can be performed on two semiconductor wafers. The wafers may be formed of fused silica or the like. At block 1104, the masked wafers are etched, for example, according to a wet etching operation to form portions of the fluidic channel and air gaps. For example, each wafer may be etched to form a hemispheric half of the channel and air gaps. When the wafers are bonded together (block 1108), the channel and air gaps are formed.

At block 1106, an intermediate layer of quartz or the like, for example, boron phosphorus glass may be formed on at least one of the fused silica wafers to allow for fusion bonding of the wafers. Accordingly, at block 1108, the wafers are bonded together. The wafers having identical etches can be coupled to bring the ratio of the size of the channel and air gaps to 1:1. Here, the intermediate layer, e.g., a boron phosphorous glass layer, may be between the two wafers for fusion bonding. The type of bonding may depend on the materials. For example, low temperature bonding may form a glass-silica interface. High temperature bonding may form a glass-glass interface.

At block 1110, the bonded wafers are masked so that at block 1112 a second etching operation can be formed on the two surfaces, for example, to form additional air gaps above and below the channel, e.g., similar to air gaps 907 shown in FIG. 9.

At block 1114, the wafer can be diced or otherwise segmented to form a plurality of flow cells.

Figure 12:
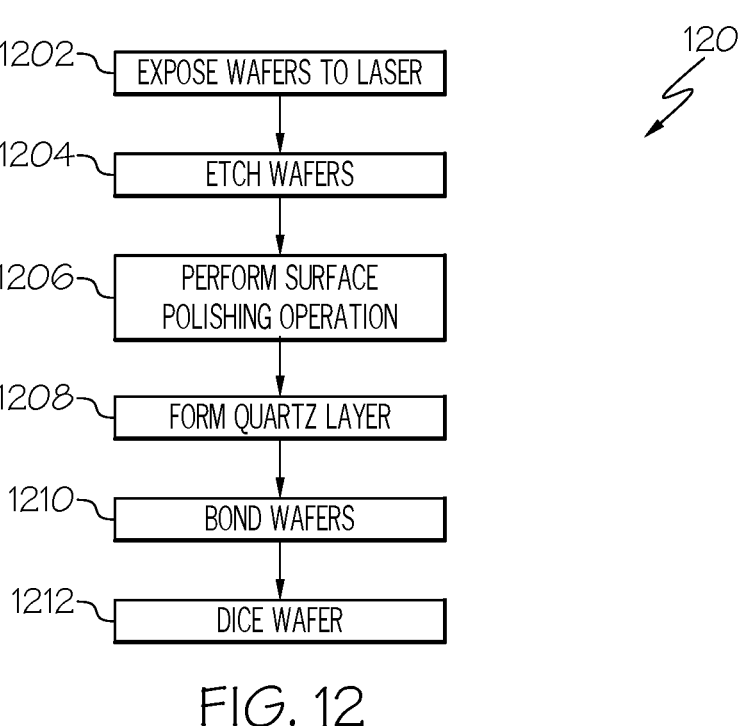
FIG. 12 is a flowchart representation of an example of another method for forming a light guiding flow cell.

FIG. 12 is a flowchart representation of an example of a method 1200 for forming a light guiding flow cell. The method 1200 can be applied to form the flow cell 700 of FIG. 7.

At block 1202, two semiconductor wafers were exposed to a laser for performing a laser subtractive method. The wafers may be formed of fused silica or the like. At block 1204, the wafers are etched. For example, one wafer may be etched to form the fluidic channel 704 and air gaps 706A, 706B, and 707B of the flow cell 700 of FIG. 7, and the other wafer may be etched to form the air gap 707A of the flow cell 700 of FIG. 7.

At block 1206, a surface polishing operation is performed on the etched interior regions defining the channel and air gaps. At block 1208, an intermediate layer of quartz or the like, for example, boron phosphorus glass may be formed on the top surfaces of the wafers to allow for fusion bonding of the wafers. Accordingly, at block 1210, the wafers are bonded together. At block 1212, the wafer can be diced or otherwise segmented to form a plurality of flow cells, for example, shown in FIG. 7.

The abovementioned flow cell constructions and manufacturing processes address design limitations of current flow cell manufacturing technologies and can provide for a next generation of flow cells. Embodiments of these flow cells may withstand higher pressure. High pressure operation allows for a single flow cell design for all absorbance detector variants, improved flow cell resilience, and a reduction in the pressure dependence of optical noise, e.g., a greater signal to noise ratio. Embodiments of these flow cells may also improve chromatographic performance. The ability to maintain peak fidelity through the detector reduces dispersion and results in improved signal in both the optical detector and any subsequent mode of detection connected downstream of the optical detector. Embodiments of these flow cells may also improve optical performance by providing a construction which enables total internal reflection and novel reflective surfaces and improves the light throughput and maximizes both signal to noise and can be also leveraged to further reduce chromatographic band broadening. Embodiments of these flow cells may also improve compatibility. For example, replacing Teflon™ AF with glass can result in improved mobile phase and analyte compatibility, which can expand the applicability of such technology to support a broader range of applications and markets. Embodiments of these flow cells may also increase the pressure and temperature reliance which will improve the robustness of the flow cell.

While various examples have been shown and described, the description is intended to be exemplary, rather than limiting and it should be understood by those of ordinary skill in the art that various changes in form and detail may be made therein without departing from the scope of the invention as recited in the accompanying claims.

What is claimed is:

1. A flow cell for a liquid chromatography detector, comprising:

a substrate;

a fluidic channel extending through the substrate; and at least one gas filled region formed in the substrate along at least a portion of a length of the fluidic channel, wherein a portion of the substrate separates the fluidic channel and the gas filled region, wherein the at least one gas filled region comprises a plurality of discrete air gaps positioned on opposite sides of the fluidic channel, wherein the at least one gas filled channel includes first and second gas filled regions adjacent to and parallel the fluidic channel, wherein an interface between the at least one gas filled region and the portion of the substrate separating the fluidic channel and the at least one gas filled region enables total internal reflection of light propagating along the fluidic channel, and wherein the total internal reflection occurs at a critical angle determined by a refractive index difference between the substrate and the at least one gas filled region.

2. The flow cell of claim 1, wherein the first gas filled region includes a first air gap extending along one side of the fluidic channel and the second gas filled region includes a second air gap extending along another side of the fluidic channel, the first and second air gaps extending in a same longitudinal direction as a direction of extension of the fluidic channel through the substrate.

3. The flow cell of claim 2, wherein the at least one gas filled region includes a third air gap above the fluidic channel and a fourth air gap below the fluidic channel, the third and fourth air gaps extending in a same longitudinal direction as a direction of extension of the fluidic channel through the substrate.

4. The flow cell of claim 2, wherein a first end of the fluidic channel receives the light, which propagates to a second end of the fluidic channel where it is directed to a detector.

5. The flow cell of claim 4, further comprising a mirror at the first end and the second end of the fluidic channel.

6. The flow cell of claim 5, wherein the mirror is integrated into the substrate at one or both of the first end and the second end.

7. The flow cell of claim 1, further comprising a reflective coating about a portion of the fluidic channel.

8. The flow cell of claim 1, wherein the at least one gas filled region includes air.

9. A flow cell for a liquid chromatography detector, comprising:

a glass substrate;

a fluidic channel extending through the substrate;

first and second gas filled regions adjacent to and parallel the fluidic channel; and a reflective coating disposed on a surface about a portion of the fluidic channel, wherein the reflective coating enables an internal reflection of light propagating along the fluidic channel, and wherein the internal reflection is achieved independently of a refractive index differential between the fluidic channel and the glass substrate.

10. The flow cell of claim 9, wherein the reflective coating is external to the fluidic channel.

11. The flow cell of claim 9, wherein the reflective coating is internal to the fluidic channel.

12. The flow cell of claim 9, wherein a portion of the glass substrate separates the fluidic channel and the reflective coating.

13. The flow cell of claim 9, wherein the first and second gas filled regions include at least a portion of the reflective coating.

14. The flow cell of claim 9, further comprising a third gas filled region above the fluidic channel and a fourth gas filled region below the fluidic channel, the third and fourth gas filled regions extending in a same longitudinal direction as a direction of extension of the fluidic channel through the substrate.

15. The flow cell of claim 9, wherein the reflective coating includes a mirror integrated in the substrate at an input and an output of the fluidic channel.

16. A flow cell for a liquid chromatography detector, comprising:

a glass substrate;

a fluidic channel formed within and extending through the glass substrate, the fluidic channel having an input and an output;

first and second gas filled regions adjacent to and parallel the fluidic channel; and an integrated mirror formed directly in the glass substrate at the input and/or the output, wherein the mirror enables an internal reflection of light propagating along the fluidic channel.

17. The flow cell of claim 16, wherein a portion of the glass substrate separates the fluidic channel and the first and second gas filled regions, and wherein an interface between the first and second gas filled regions and the portion of the glass substrate separating the fluidic channel and the first and second gas filled regions enables an internal reflection of light propagating along the fluidic channel.

18. The flow cell of claim 17, wherein the first and second gas filled regions includes first and second air gaps, wherein the first air gap extends along one side of the fluidic channel and the second air gap extends along another side of the fluidic channel.

19. The flow cell of claim 16, further comprising a third air gap above the fluidic channel and a fourth air gap below the fluidic channel, the third and fourth air gaps extending in a same longitudinal direction as a direction of extension of the fluidic channel through the substrate.

* * * * *